Jan. 17, 1928.

J. BURNETT 1,656,773

AUTOMOTIVE CULTIVATOR

Filed Jan. 25, 1927

Inventor
John Burnett

By Clarence A. O'Brien
Attorney

Jan. 17, 1928.

J. BURNETT 1,656,773

AUTOMOTIVE CULTIVATOR

Filed Jan. 25, 1927

Inventor
John Burnett

By Clarence A. O'Brien
Attorney

Jan. 17, 1928.
J. BURNETT
1,656,773
AUTOMOTIVE CULTIVATOR
Filed Jan. 25, 1927
4 Sheets-Sheet 3
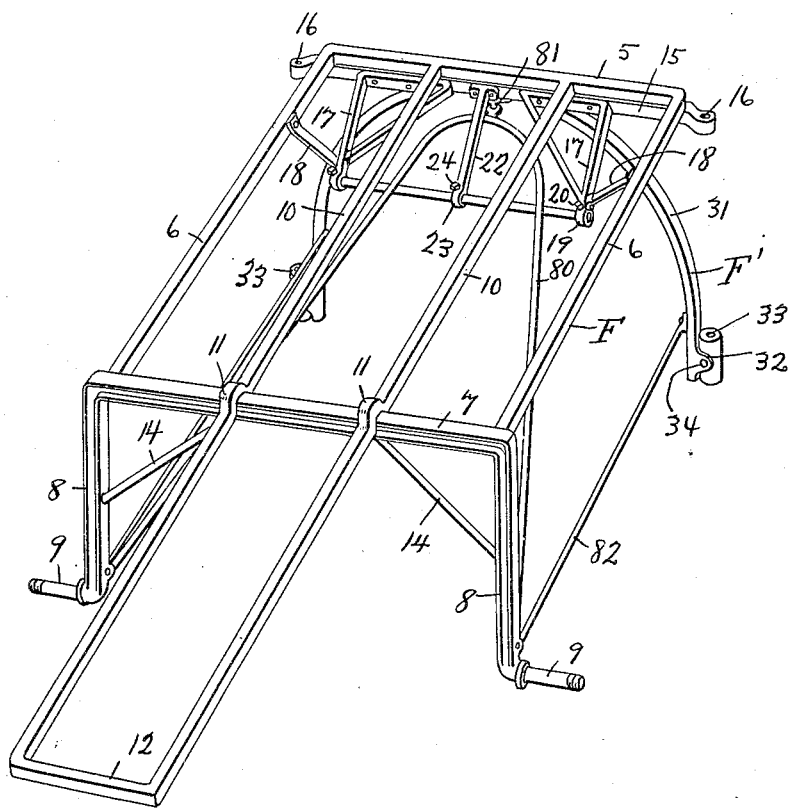
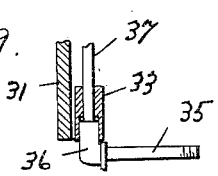
Inventor
John Burnett
By Clarence A O'Brien
Attorney Jan. 17, 1928.
J. BURNETT
1,656,773
AUTOMOTIVE CULTIVATOR
Filed Jan. 25, 1927
4 Sheets-Sheet 4
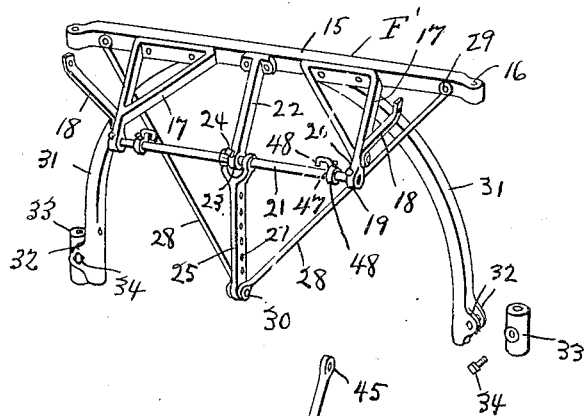
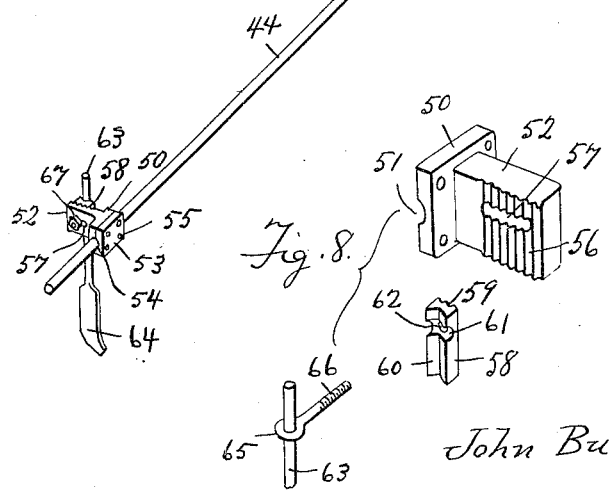
Inventor
John Burnett
By *Clarence A. O'Brien*
Attorney Patented Jan. 17, 1928.

1,656,773

UNITED STATES PATENT OFFICE.

JOHN BURNETT, OF PAULS VALLEY, OKLAHOMA.

AUTOMOTIVE CULTIVATOR.

Application filed January 25, 1927. Serial No. 163,437.

The present invention relates to an agricultural machine particularly of the cultivator type and has for its prime object to provide an automotive mobile structure which is economical to operate, comparatively inexpensive to manufacture, strong and durable, easy to manipulate, and having its parts located in a compact and convenient manner to be readily accessible.

Another very important object of the invention resides in the provision of a machine of this nature having a pair of implement rods pivotally mounted on the mobile frame and having means associated therewith whereby they may be moved to and held in different adjusted positions.

Another specific object of the invention resides in the provision of novel means for attaching implements such as cultivator tools to the implement rod.

A still further very important object of the invention lies in the provision of an automotive mobile frame structure which will straddle a row or rows of plants to be cultivated.

With the above and numerous other objects in view, as will appear as the description proceeds, the invention resides in certain novel features of construction, and in the combination and arrangement of parts as will be hereinafter more fully described and claimed.

In the drawing:

Fig. 5 is a perspective view of the frame, Fig. 6 is a perspective view of the front portion of the frame.

Fig. 7 is a perspective view of one of the implement rods showing an implement mounted thereon, Fig. 8 is a disassembled perspective view of one of the devices for engaging an implement on one of the implement rods, Fig. 9 is an enlarged detail sectional view showing the mounting of one of the front wheel spindles.

Figure 1:
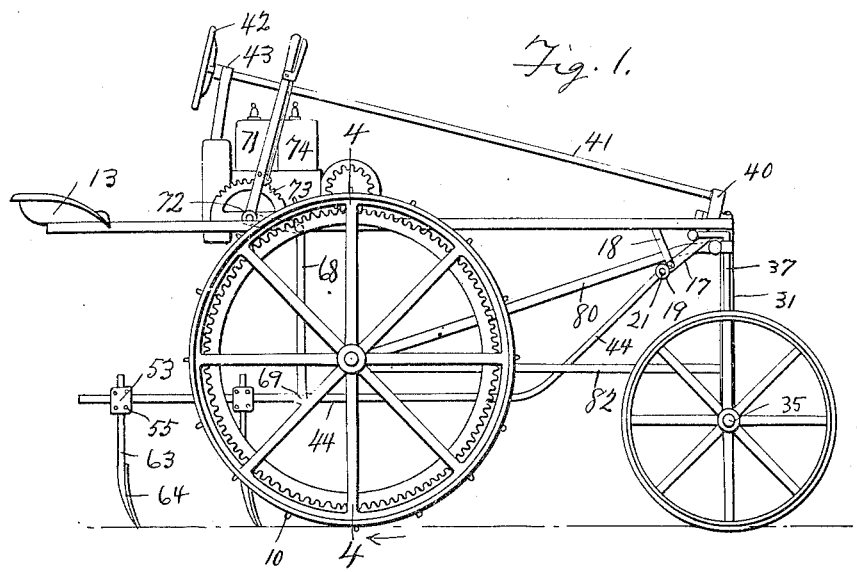
Figure 1 is a side elevation of the machine embodying the features of my invention.
Figure 2:
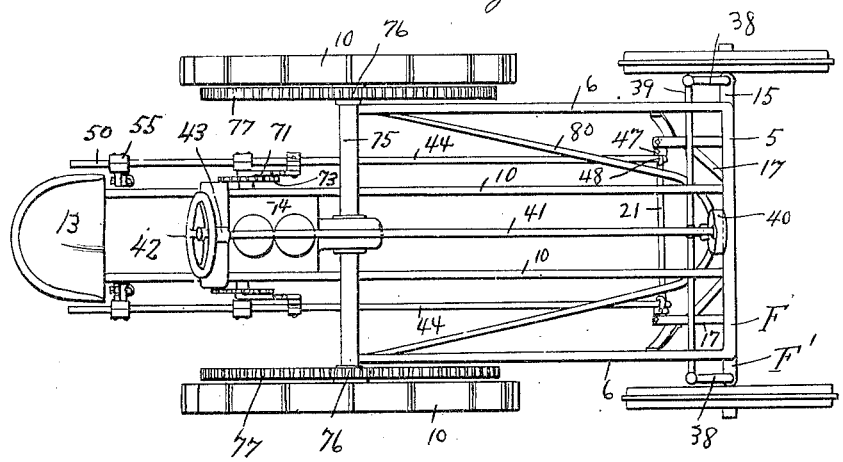
Fig. 2 is a top plan view thereof.
Figure 3:
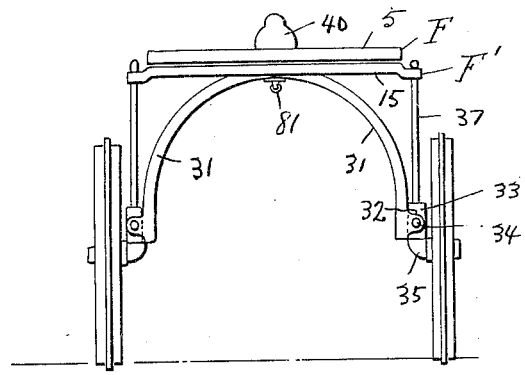
Fig. 3 is a fragmentary front elevation.
Figure 4:
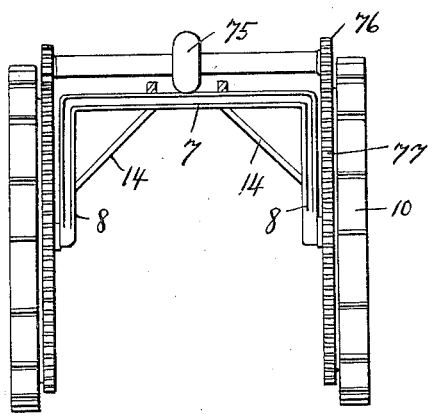
Fig. 4 is a detailed section taken vertically and transversely through the machine substantially on the line 4—4 of Figure 1.

Referring to the drawing in detail, it will be seen that the frame is denoted generally by the letter F and includes a front bar 5, side bars 6 and a rear axle bar 7. This rear axle bar is of an inverted U-shaped formation to provide an upper bight portion with legs 8 depending therefrom and terminating in outwardly directed stub axles 9 on which are journaled rear bow wheels 10. Longitudinal bars 10 extend in parallel spaced relation to each other rearwardly from the front bars 5 in spaced parallelism with side bars 6 and between said side bars 6 and have intermediate curved portions 11 extending over the bight of the axle bar 7 and extend rearwardly therefrom and are connected at their rear end by exhaust bar 12 on which is mounted a seat 13. Diagonal braces 14 are disposed between the bight and legs of the inverted U-shaped axle bar 7. An auxiliary front frame structure is denoted generally by the letters F' and is shown to advantage in Figure 6. This auxiliary front frame structure includes a transverse bar 15 the ends of which are apertured vertically as at 16. Triangular brackets 17 are fixed to the transverse bar 15 and extend rearwardly and incline downwardly and have arms 18 which are adapted to be engaged with the side bars 6 a distance rearwardly of the front bar 5 as is illustrated in Figure 5. The rear lower ends of the triangular bracket 17 terminate in sleeves 19 having set screws 20 associated therewith so that a rod 21 may be held in the eyes 19 against accidental displacement. A bracket arm 22 extends rearwardly from the bar 15 and inclines downwardly and is disposed between the brackets 17 and terminates in a sleeve 23 to receive the rod 21 and a set screw 24 is associated with said sleeve 23 to engage said rod 21. An arm 25 has its upper end merging into a yoke 26 to straddle the sleeve 23 and the ends of the yokes are apertured to receive the rod 21. This arm 25 is provided with longitudinal series of openings 27. Brake rods 28 are engaged as at 29 adjacent the ends of the bar 15 and incline rearwardly and downwardly and converge towards each other to be engaged with a pin 30 which passes through one of the openings 27. Standards 31 depend downwardly from the central portion of the bar 15 being preferably formed integrally therewith and these standards outwardly being of substantially arcuate formation and at their lower ends are provided each with a pair of outwardly directed apertured ears 32. Between these ears 32 there are mounted bearing sleeves 33 held pivotally between the ears by screws or the like 34 passing through the apertured ears 32. The bores of the two sleeves 33 are adapted to register with the apertures 16. Spindles 35 have upwardly directed inner ends 36 journaled in sleeves 33 and shafts 37 extend upwardly therefrom and are journaled in apertures 16 and then terminate in rearwardly directed cranks 38 with which are pivotally engaged a connecting rod 39.

A steering mechanism 40 is operatively associated with the connecting rod 38 and is operated by shaft 41 which extends rearwardly therefrom and inclines upwardly having at its rear end a steering wheel 42, the rear end of the shaft 41 being journaled in a bracket 43.

The numerals 44 denote the new implement rod the forward ends of which are bent upwardly and terminate in eyes 45 to receive rods 41. Sleeves 46 are mounted on the rod 41 and are held in different adjusted positions by set screws 47. These sleeves 46 have hooked fingers 48 for engaging over the eyes 45 to hold said eyes against longitudinal movement on the rod 21. The eyes, however, may rotate or oscillate to a certain extent. On each rod 44 there are mounted a plurality of implement engaging members each of which comprises a plate 50 having a channel 51 in one face thereof to receive the rod and extending from the other face thereof an arm 52. A clamp plate 53 is also formed with a channel as at 54 and fastening elements 55 hold the two plates 50 and 53 together with the rod 44 therebetween. The arm 52 is adapted to extend inwardly and horizontally and is provided on its forward face with vertical corrugations 56 and is provided with a longitudinally extending slot 57 transverse to the corrugations 56. A block 58 has one face provided with corrugations 59 adapted to engage corrugations 56 and on its other face is provided with a vertical channel 60, a transverse 61 from which extends an aperture 62. Shank 63 of implement 64 projects through eye 65 on eye-bolt 66. The eye-bolt 66 is adapted to pierce the aperture 62 and the slot 57 and has a nut 67 on its end to clamp the parts together with the eye 65 seated in the recess 61 and the shank 63 seated in the channel 60.

A link 68 is pivotally engaged as at 69 with each rod 44. The upper ends of these links 68 are pivotally engaged with cranks 70 of lever 71 which are pivoted as at 72 on the frame structure F so that by swinging the levers 71 rearwardly rods 44 may be swung upwardly to disengage the implements 64 from the ground. In the present instance the implements 64 are in the form of cultivator shovels but any other suitable implements may be substituted therefor as may be desired. Suitable means 73 are associated with the levers 71 so that they may be held in different adjusted positions.

An internal combustion engine 74 is mounted on the bars 10 rearwardly of the axle bar 7 and is operatively connected with the differential driving mechanism 75 having pinions 76, one adjacent each bow wheel 10. Gears 77 are mounted on the bow wheels 10 and mesh with pinions 76 so that when the engine is in operation, the bow wheels 10 will turn to drive the machine.

A radius rod 80 is of U-formation and has its bight flexibly connected as at 81 with the bar 15 and its ends connected with the lower ends of the axle bar 7. Rods 82 connect the lower portions of standards 31 with the lower end of the axle bar 7.

It is though that the construction, operation, and utility, and advantages of this invention will now be clearly understood without a more detailed description thereof. The present embodiment of the invention has been disclosed in detail merely by way of example since in actual practice it attains the features of advantage enumerated as desirable in the statement of the invention and the above description. It will be apparent that changes in the details of construction, and in the combination and arrangement of parts may be resorted to without departing from the spirit or scope of the invention as hereinafter claimed or sacrificing any of its advantages.

Having thus described my invention what I claim as new is:—

1. In a machine of the class described, a main frame comprising a front transverse bar, a pair of side bars extending rearwardly from the ends of the front transverse bar, an inverted U-shaped axle bar at the rear ends of the side bars, said axle bars terminating in outwardly and transversely directed stub axles, a pair of spaced parallel longitudinal bars projecting rearwardly from the front transverse bar between and in spaced parallelism with the side bars and terminating rearwardly of the axle bars, intermediate portions of the longitudinal bars being curved to pass over the bight of the axle bar, and a cross bar connecting the rear ends of the longitudinal bars; a seat on the cross bar; and wheels journaled on the stub axles.

2. In a machine of the class described, a main frame comprising a front transverse bar, a pair of side bars extending rearwardly from the ends of the front transverse bars, an inverted U-shaped axle bar at the rear ends of the side bars, said axle-bar terminating in outwardly and transversely directed stub axles, a pair of spaced parallel longitudinal bars projecting rearwardly from the front transverse bars between and in spaced parallelism with the side bars and terminating rearwardly of the axle bar, intermediate portions of the longitudinal bars being curved to pass over the bight of the axle bar, and a cross bar connecting the rear ends of the longitudinal bars; a seat on the cross bar; wheels journaled on the stub axle; an auxiliary front frame comprising a front transverse bar below the first front bars and having apertures in its ends, curved standards depending from the intermediate portions of the transverse bar of the auxiliary frame, bearing sleeves mounted on the standards, spindles having portions journaled in the sleeves, wheels journaled on the spindles, shafts connected with said portions of the spindles, and means for turning said shaft to steer the last-mentioned wheels.

3. In a machine of the class described, a main frame comprising a front transverse bar, a pair of side bars extending rearwardly from the ends of the front transverse bars, an inverted U-shaped axle bar at the rear ends of the side bars, said axle bar terminating in outwardly and transversely directed stub axles, a pair of spaced parallel longitudinal bars projecting rearwardy from the front transverse bar between and in spaced parallelism with the side bars and terminating rearwardly of the axle bars, intermediate portions of the longitudinal bars being curved to pass over the bight of the axle bar, and a cross bar connecting the rear ends of the longitudinal bars; a seat on the cross bar; wheels on the stub axles; and an auxiliary front frame comprising a front transverse bar located below the first front bar and having apertures in its ends, pairs of standards depending from the intermediate portions of the second front transverse bar, a pair of ears projecting outwardly from each standard, bearings journaled between said standards; spindles having portions journaled in the bearings; wheels journaled on the spindles; shafts connected to said portions of the shanks and journaled through the apertures; and means for turning said shafts to steer the second-mentioned wheels.

4. In a machine of the class described, a main frame comprising a front transverse bar, a pair of side bars extending rearwardly from the ends of the front transverse bars, an inverted U-shaped axle bar at the rear ends of the side bars, said axle bar terminating in outwardly and transversely directed stub axles, a pair of spaced parallel longitudinal bars projecting rearwardly from the front transverse bar between and in spaced parallelism with the side bars and terminating rearwardly of the axle bars, intermediate portions of the longitudinal bars being curved to pass over the bight of the axle bar, and a cross bar connecting the rear ends of the longitudinal bars; a seat on the cross bar; wheels on the stub axles; and an auxiliary front frame comprising a front transverse bar located below the first front bar and having apertures in its ends, pairs of standards depending from the intermediate portions of the second front transverse bar, a pair of ears projecting outwardly from each standard, bearings journaled between said standards; spindles having portions journaled in the bearings; wheels journaled on the spindles; shafts connected to said portions of the shanks and journaled through the apertures; and means for turning said shafts to steer the second-mentioned wheels; brackets projecting rearwardly and inclining downwardly from the second front transverse bar and terminating in sleeves, a rod in said sleeves, set screws associated with said sleeves to engage said rod, implement rods having eyes receiving first-mentioned rod and means for mounting implements on said implement rod.

5. In a machine of the class described, a main frame comprising a front transverse bar, a pair of side bars extending rearwardly from the ends of the front transverse bars, an inverted U-shaped axle bar at the rear ends of the side bars, said axle bar terminating in outwardly and transversely directed stub axles, a pair of spaced parallel longitudinal bars projecting rearwardly from the front transverse bar between and in spaced parallelism with the side bars and terminating rearwardly of the axle bars, intermediate portions of the longitudinal bars being curved to pass over the bight of the axle bar, and a cross bar connecting the rear ends of the longitudinal bars; a seat on the cross bar; wheels on the stub axles; and an auxiliary front frame comprising a front transverse bar located below the first front bar and having apertures in its ends, pairs of standards depending from the intermediate portions of the second front transverse bar, a pair of ears projecting outwardly from each standard, bearings journaled between said standards; spindles having portions journaled in the bearings; wheels journaled on the spindles; shafts connected to said portions of the shanks and journaled through the apertures; and means for turning said shafts to steer the second-mentioned wheels; an implement rod engaged with the first transverse bar and means for raising and lowering said implement rod.

In testimony whereof I affix my signature.

JOHN BURNETT.